US012665971B2

(12) United States Patent
Shirai

(10) Patent No.: US 12,665,971 B2
(45) Date of Patent: Jun. 23, 2026

(54) IMAGE FORMATION APPARATUS, CONTROL METHOD, AND STORAGE MEDIUM

(71) Applicant: CANON KABUSHIKI KAISHA, Tokyo (JP)

(72) Inventor: Hayato Shirai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/362,002

(22) Filed: Jul. 31, 2023

(65) Prior Publication Data

US 2024/0056534 A1 Feb. 15, 2024

(30) Foreign Application Priority Data

Aug. 15, 2022 (JP) ................................. 2022-129219

(51) Int. Cl.
*H04N 1/00* (2006.01)
*G06F 3/0482* (2013.01)
*G06F 3/04845* (2022.01)

(52) U.S. Cl.
CPC ....... *H04N 1/00413* (2013.01); *G06F 3/0482* (2013.01); *G06F 3/04845* (2013.01); *H04N 1/00896* (2013.01)

(58) Field of Classification Search
CPC ........... H04N 1/00413; H04N 1/00896; H04N 1/00411; G06F 3/0482; G06F 3/04845; Y02D 10/00
See application file for complete search history.

(56) References Cited

U.S. PATENT DOCUMENTS

| | | | | |
|---|---|---|---|---|
| 2009/0147969 A1* | 6/2009 | Kinouchi | ............. | H04R 1/1083 |
| | | | | 381/94.7 |
| 2009/0158213 A1* | 6/2009 | Ryu | .................. | H04M 1/72466 |
| | | | | 715/810 |
| 2009/0165145 A1* | 6/2009 | Haapsaari | ............. | H04L 67/306 |
| | | | | 726/28 |
| 2012/0157165 A1* | 6/2012 | Kim | .................... | G06F 21/6218 |
| | | | | 455/566 |
| 2013/0003104 A1* | 1/2013 | DeFore | ................. | G06F 3/1205 |
| | | | | 358/1.14 |
| 2014/0187200 A1* | 7/2014 | Reitter | .................... | H04W 4/30 |
| | | | | 455/410 |
| 2024/0427538 A1* | 12/2024 | Narita | ................... | G06F 3/1205 |

FOREIGN PATENT DOCUMENTS

| | | |
|---|---|---|
| JP | 2004-198889 A | 7/2004 |
| JP | 2019-150982 A | 9/2019 |

* cited by examiner

*Primary Examiner* — Andrey Belousov

(74) *Attorney, Agent, or Firm* — Venable LLP

(57) ABSTRACT

An image formation apparatus, a control method, and a storage medium that can suppress the decrease in the convenience are provided. To this end, each setting of an operation mode is activated with a user selecting a custom home screen from a default home screen in accordance with a usage scene.

26 Claims, 7 Drawing Sheets

| SETTING ITEM | WORK SCENE | STUDY SCENE | LIFE SCENE |
|---|---|---|---|
| DOUBLE-SIDE PRINTING SETTING | ACTIVATED | DEACTIVATED | DEACTIVATED |
| SILENT SETTING | ACTIVATED | ACTIVATED | DEACTIVATED |
| AUTOMATIC POWER-OFF SETTING | DEACTIVATED | DEACTIVATED | ACTIVATED |
| LOCK TIMER | 5 MINUTES | 10 MINUTES | 10 MINUTES |

| SETTING ITEM | WORK SCENE | STUDY SCENE | LIFE SCENE |
|---|---|---|---|
| DOUBLE-SIDE PRINTING SETTING | ACTIVATED | DEACTIVATED | DEACTIVATED |
| SILENT SETTING | ACTIVATED | ACTIVATED | DEACTIVATED |
| AUTOMATIC POWER-OFF SETTING | DEACTIVATED | DEACTIVATED | ACTIVATED |
| LOCK TIMER | 5 MINUTES | 10 MINUTES | 10 MINUTES |

FIG.5

IMAGE FORMATION APPARATUS, CONTROL METHOD, AND STORAGE MEDIUM

BACKGROUND OF THE INVENTION

Field of the Invention

The present invention relates to an image formation apparatus, a control method, and a storage medium that are capable of switching setting in accordance with a usage scene.

Description of the Related Art

Japanese Patent Laid-Open No. 2004-198889 discloses an image formation apparatus that has a copy function and a print function and that includes a mode switching unit, in which, in accordance with those functions, the mode switching unit switches between a default operation mode and a low noise mode in which the function is executed under operation conditions that the operating noise is reduced more than that in the default operation mode.

Additionally, Japanese Patent Laid-Open No. 2019-150982 discloses a printing apparatus that automatically configures setting so as to make different error notifications in accordance with applications and intentions depending on a home screen selected from multiple home screen options by an instruction inputted by a user.

However, in Japanese Patent Laid-Open No. 2004-198889, a usage scene is not taken into consideration, and the operation mode is not switched automatically in accordance with the usage scene. For this reason, a user needs to switch the operation mode in accordance with the usage scene every time, and the convenience is decreased.

Additionally, in Japanese Patent Laid-Open No. 2019-150982, even though it is possible to select the home screen in accordance with the usage scene, the operation mode is not switched automatically in accordance with the usage scene. For this reason, the user needs to switch the operation mode every time, and the convenience is decreased.

SUMMARY OF THE INVENTION

Therefore, the present invention provides an image formation apparatus, a control method, and a storage medium that can suppress the decrease in the convenience.

An image formation apparatus of the present invention includes: a display control unit that is capable of selectively displaying a plurality of home screens on a display unit; and a switching unit that switches one of the home screens displayed on the display unit to the other home screen, in which the image formation apparatus further comprises a changing unit that changes an operation mode of the image formation apparatus in accordance with the switching of the home screen by the switching unit.

According to the present invention, it is possible to provide an image formation apparatus, a control method, and a storage medium that can suppress the decrease in the convenience.

Further features of the present invention will become apparent from the following description of exemplary embodiments with reference to the attached drawings.

BRIEF DESCRIPTION OF THE DRAWINGS

FIG. 5 is a table illustrating an example of setting including an operation mode for each usage scene;

DESCRIPTION OF THE EMBODIMENTS

An embodiment of the present invention is described below with reference to the drawings.

Figure 1:
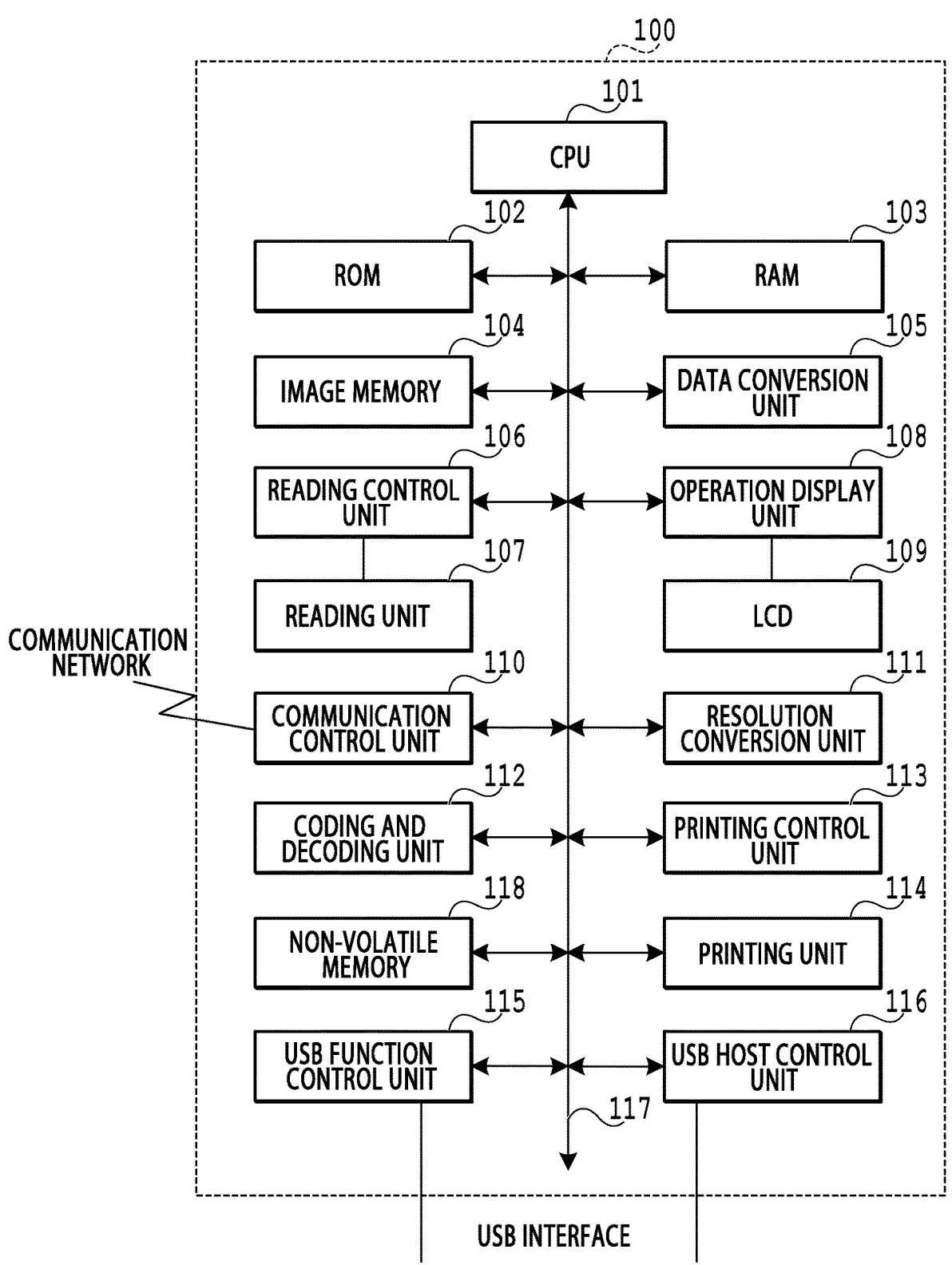
FIG. 1 is a block diagram illustrating a schematic configuration example of an MFP.

FIG. 1 is a block diagram illustrating a schematic configuration example of a multifunction peripheral (MFP) 100 in the present embodiment. The MFP 100 is a type of an information processing apparatus. Additionally, the MFP 100 is a type of electronic equipment. The MFP 100 of the present embodiment has an information processing function such as generating, storing, and transmitting device information including log information and state information. In addition, the MFP 100 has an image formation function to form an image on a printing medium by a printing control unit 113 and a printing unit 114, which are described later.

The MFP 100 includes a CPU 101, a ROM 102, a RAM 103, an image memory 104, a data conversion unit 105, a reading control unit 106, a reading unit 107, an operation display unit 108, an LCD 109, a communication control unit 110, and a resolution conversion unit 111. In addition, the MFP 100 includes a coding and decoding unit 112, the printing control unit 113, the printing unit 114, a USB function control unit 115, a USB host control unit 116, a bus 117, and a non-volatile memory 118.

The CPU 101 is a system control unit and controls overall the MFP 100. The ROM 102 is a non-volatile memory that stores fixed data such as a control program executed by the CPU 101, a data table, and a built-in operating system (OS). In the present embodiment, each control program stored in the ROM 102 performs software execution control such as scheduling, task switching, and interrupt processing under the management by the built-in OS stored in the ROM 102. The ROM 102 stores information indicating a permission state, which indicates whether to provide device information to the outside. The RAM 103 is formed of a static random access memory (SRAM) or the like that requires a backup power supply, and feeding to the RAM 103 is guaranteed by a not-illustrated primary battery for data backup. The RAM 103 stores a program control variable and the like.

The image memory 104 is formed of a dynamic random access memory (DRAM) or the like and can store image data. Additionally, a part of the area in the image memory 104 is secured as a work area to execute software processing. The data conversion unit 105 can perform conversion of the image data such as analysis of a page description language (PDL) and computer graphics (CG) development of character data.

The reading unit 107 optically reads an original document by a CIS image sensor and converts it into an electric image signal. The reading control unit 106 performs various types of image processing such as binarization processing and halftone processing to this image signal and outputs high-definition image data. A method of optically reading the original document may be either of: a sheet reading control method in which the original document is read by a fixed CIS image sensor; and a book reading control method in which the original document fixed on a platen glass is read by a moving CIS image sensor.

The operation display unit (including a display control unit) 108 is capable of displaying a home screen and the like and includes a minimal key such as a numeric value input key, a mode setting key, a determination key, and a cancel key, a light-emitting diode (LED) or seven-segment display unit, and the like. The above-described various keys are implemented by a so-called software key displayed on the LCD 109 and can receive an operation from a user. If the operation by the user is not made for a certain period of time, the LCD 109 switches off a backlight of the LCD 109 to reduce the power consumption.

The communication control unit 110 controls communication between the MFP 100 and a communication network 300 and establishes connection to an Internet service provider and communication of various data with a service management server 200. Additionally, the communication control unit 110 can determine whether the MFP 100 is connected to the Internet or is connected to only a LAN. The connection between the communication control unit 110 and the communication network 300 is established by a publicly known method such as HTTP and XMPP. The resolution conversion unit 111 performs resolution conversion processing such as mutual conversion between image data in millimeters and image data in inches.

The resolution conversion unit 111 can execute also scaling processing of image data. The coding and decoding unit 112 performs coding and decoding processing or performs scaling processing on the image data (uncompressed, MH, MR, MMR, JBIG, JPEG, and so on) treated by the MFP 100. The printing control unit 113 performs various types of image processing such as smoothing processing, printing density correction processing, and color correction on the image data to be printed to convert it into high-definition image data and then outputs it to the printing unit 114. Additionally, the printing control unit 113 also plays a role to obtain state information data of the printing unit 114 regularly. The printing unit 114 is formed of a laser beam printer, an ink-jet printer, or the like and prints the image data generated by the printing control unit 113 on the printing medium such as a paper sheet.

The USB function control unit 115 performs protocol control according to the USB communication standard. The USB host control unit 116 is a control unit to establish communication based on the protocol determined by the USB communication standard. This USB communication standard is a standard for bidirectional high-speed data communication. According to this USB communication standard, it is determined that multiple hubs or functions (slaves) are connectable to a single host (master). That is, the USB host control unit 116 provides a function as a host in the USB communication.

The non-volatile memory 118 is a non-volatile memory that stores data obtained from a network and setting of an information processing apparatus. The constituents other than the reading unit 107 and the LCD 109 are connected to each other through the bus 117. The operation display unit 108 includes a screen in the tab form.

Figure 2:
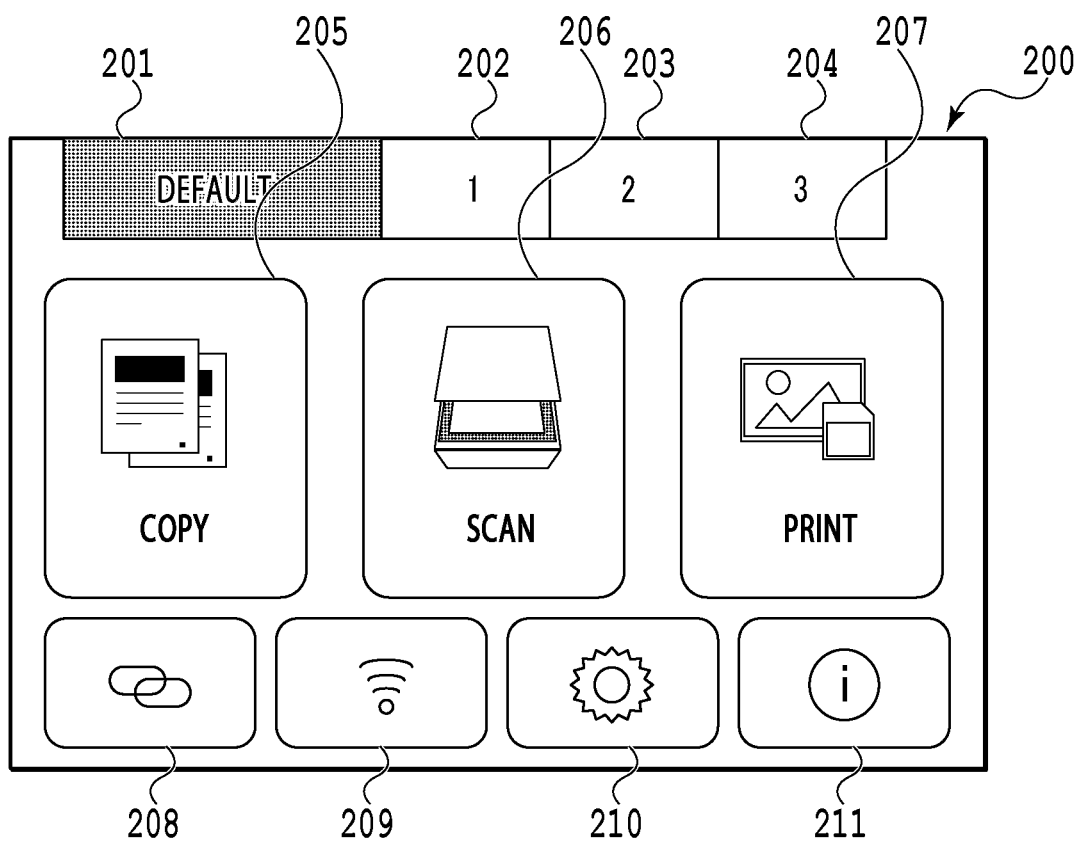
FIG. 2 is a diagram illustrating a default home screen displayed on an operation panel.

FIG. 2 is a diagram illustrating a default home screen displayed on an operation panel of the MFP 100. The default home screen is a main menu screen, and a tab 201 is a tab corresponding to the default home screen. Tabs 202, 203, and 204 are each tabs corresponding to a custom home screen. The custom home screen is a sub menu screen, and multiple custom home screens are provided in accordance with a usage scene. The user can switch the home screen by pressing the tab, and the custom home screen is selectively displayed on the operation display unit 108. Changing the tab color of the tab 201 from the color of the other tabs indicates that the default home screen is now displayed. A copy menu button 205, a scan menu button 206, a print menu button 207, a LAN button 208, a wireless connection button 209, a setting button 210, and a hint button 211 are buttons respectively corresponding to menus. Transition to each menu corresponding to each button is made with the user pressing the corresponding button.

Figures 3A, 3B, 3C:
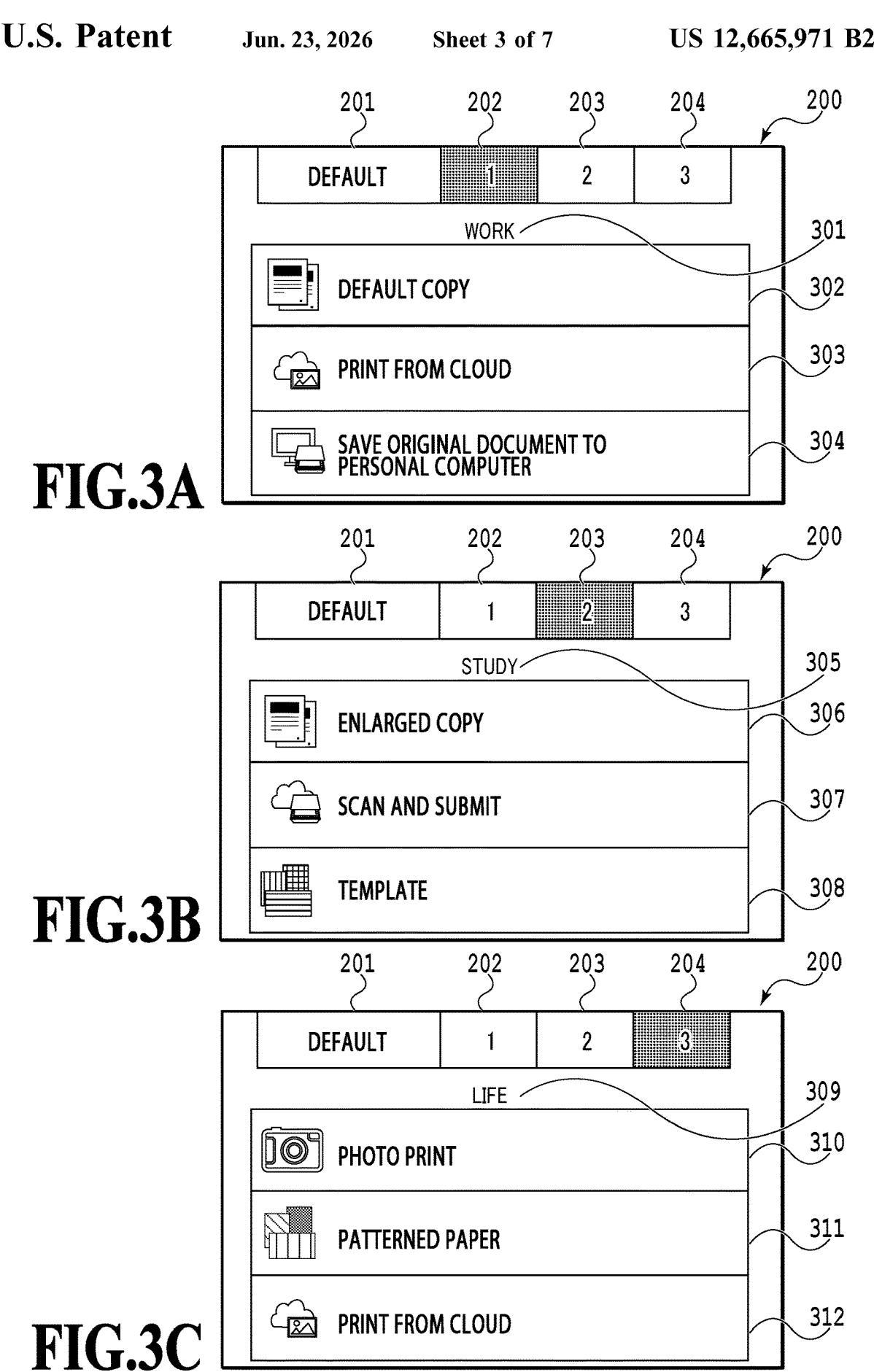
FIG. 3A is a diagram illustrating a custom home screen of a tab displayed on the operation panel.
FIG. 3B is a diagram illustrating a custom home screen of a tab displayed on the operation panel.
FIG. 3C is a diagram illustrating a custom home screen of a tab displayed on the operation panel.

FIGS. 3A to 3C are diagrams illustrating the custom home screen corresponding to each of tabs 1, 2, and 3 displayed on the operation panel. Changing the tab color of each of the tabs 202, 203, and 204 from the color of the other tabs indicates that the custom home screen of the corresponding one of the tabs 1, 2, and 3 is now displayed. Custom menus 302, 303, 304, 306, 307, 308, 310, 311, and 312 are menus that the user is able to custom, and it is possible to designate a function to be displayed in the position of each menu. Each of a first custom screen 301, a second custom screen 305, and a third custom screen 309 can be categorized in accordance with a specific application or the user. The first custom screen 301 is categorized as a work application, the second custom screen 305 is categorized as a study application, and the third custom screen 309 is categorized as a life application, and it is possible to arrange the menu that is frequently used in each application on the home screen.

FIG. 3A is the custom home screen in which the menu frequently used in a work scene is arranged on the home screen. The first custom screen 301 displays that it is the custom home screen for the work scene. The custom menu 302 is default copying, the custom menu 303 is printing from cloud, and the custom menu 304 is saving an original document to a personal computer; thus, the menu frequently used in the work scene is arranged.

FIG. 3B is the custom home screen in which the menu frequently used in a study scene is arranged on the home screen. The second custom screen 305 displays that it is the custom home screen for the study scene. The custom menu 306 is enlarged copying, the custom menu 307 is scanning and submitting, and the custom menu 308 is a template; thus, the menu frequently used in the study scene is arranged.

FIG. 3C is the custom home screen in which the menu frequently used in a life scene is arranged on the home screen. The third custom screen 309 displays that it is the custom home screen for the life scene. The custom menu 310 is photo printing, the custom menu 311 is patterned paper, and the custom menu 312 is printing from cloud; thus, the menu frequently used in the life scene is arranged.

A function icon such as default copying that is displayed for each scene may be determined in advance as factory default or the like or may be configured so as to be changeable by the user.

Figure 4:
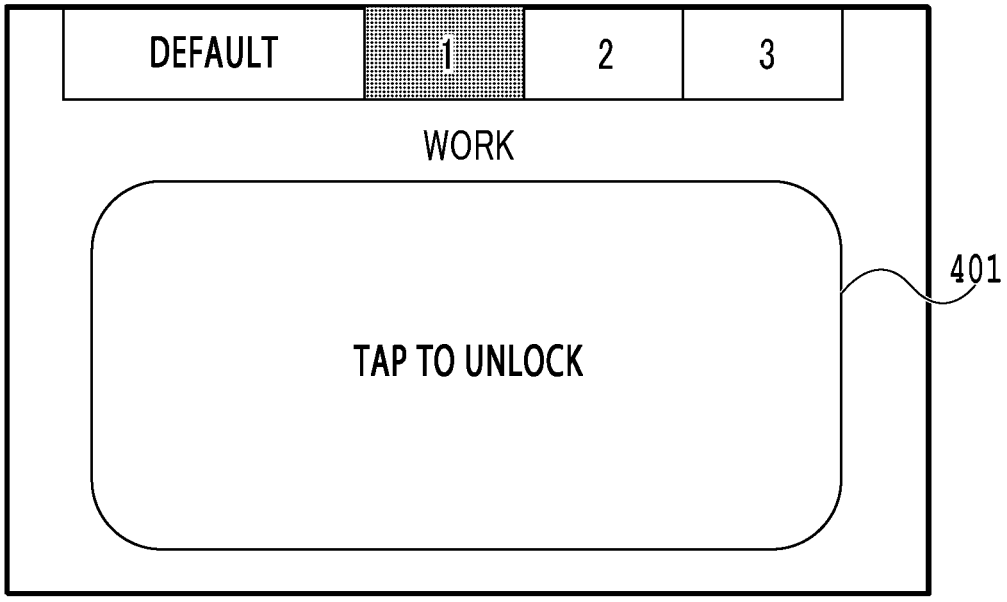
FIG. 4 is a lock screen in the custom home screen.

FIG. 4 is a lock screen in the custom home screen displayed on the operation panel. Once the user selects the tab of the locked custom home screen, the custom home screen is not displayed but the lock screen illustrated in FIG. 4 is displayed. With the user pressing an unlock button 401 of the lock screen, a password input screen is displayed, and if a password inputted by the user matches a registered password, the custom home screen is displayed.

FIG. 5 is a table illustrating an example of setting of an operation mode for each usage scene. The user can set each setting item of the operation mode for each usage scene. In the example in FIG. 5, each setting of double-side printing setting, silent setting, and automatic power-off setting can be set to be activated or deactivated, and additionally, it is possible to set the time of a lock timer.

The double-side printing setting is setting of a low cost mode to suppress consumption of a running cost, and the double-side printing setting is activated in the work scene. This meets a user need in a case where there is a demand to suppress paper consumption for a printed product at work, and is setting to automatically perform the double-side printing if the double-side printing is possible. Additionally, the silent setting is setting of a silent mode to suppress operating noise of the MFP 100 and is activated in the work scene and the study scene to concentrate on a task. The automatic power-off setting is setting of an energy saving mode to suppress power consumption, and is deactivated in the work scene and the study scene such that the MFP 100 can operate immediately in scanning and the like.

Additionally, in the work scene, there may be access to confidential information of a company through a cloud application in some cases. For this reason, there is required to enhance the security, and thus a lock timer is set to five minutes, which is shorter than that in the study scene and the life scene. As described in those examples, it is possible to set the operation mode in accordance with the user need for each usage scene depending on a usage situation.

Thus, in the MFP 100 in the present embodiment, each setting of the operation mode is determined in advance for each usage scene, and each setting including the operation mode is activated with the user selecting the custom home screen from the default home screen in accordance with the usage scene. Therefore, in the MFP 100, there is no need for the user to switch (change) the operation mode every time in accordance with the usage scene, and this can improve the convenience. The operation mode corresponding to each scene may be configured to be settable by the user. A setting screen for the setting may be provided by the MFP 100.

Figure 6:
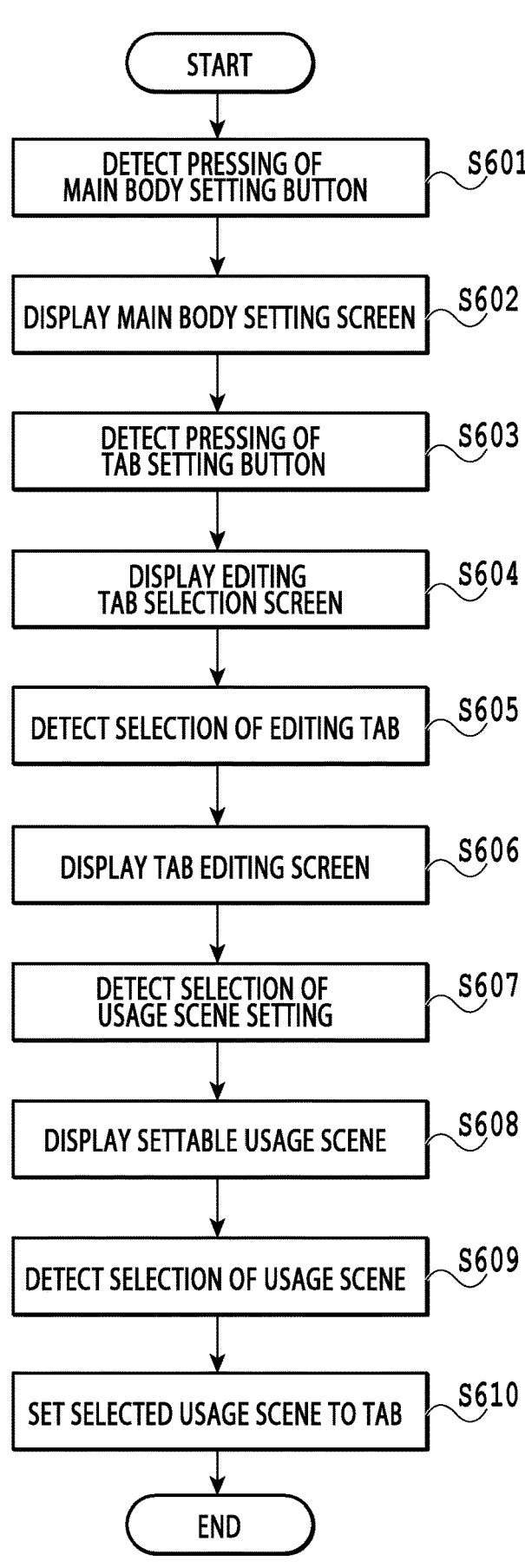
FIG. 6 is a flowchart of setting processing to set the usage scene to the tab.

FIG. 6 is a flowchart of setting processing to set the usage scene to the tab in advance before the image formation by the MFP 100. A series of processing illustrated in FIG. 6 is performed with the CPU 101 of the MFP 100 deploying a program code stored in the ROM 102 to the RAM 103 to execute. Alternatively, a part of or all the functions of the steps in FIG. 6 may be implemented by hardware such as an ASIC or an electronic circuit. Note that, a sign "S" in a description of the processing means it is a step in the flowchart.

Once the setting processing of the usage scene is started, and once the CPU 101 in S601 detects that a main body setting button is pressed, the CPU 101 in S602 displays a main body setting screen. Thereafter, once the CPU 101 in S603 detects that a tab setting button is pressed, the CPU 101 in S604 displays an editing tab selection screen. Then, once the CPU 101 in S605 detects that an editing tab is selected, the CPU 101 in S606 displays a tab editing screen. Thereafter, once the CPU 101 in S607 detects that usage scene setting is selected, the CPU 101 in S608 displays a settable usage scene. Once the CPU 101 in S609 detects that the usage scene is selected, the CPU 101 in S610 sets the selected usage scene to the tab selected in S605. The MFP 100 can be adapted to multiple usage scenes by performing such processing on the multiple tabs. It is not limited to the configuration to execute the selection of the usage scene by the operation on the tab, and a configuration to display a scene list and accept the selection by the user may be applicable, for example.

Figure 7:
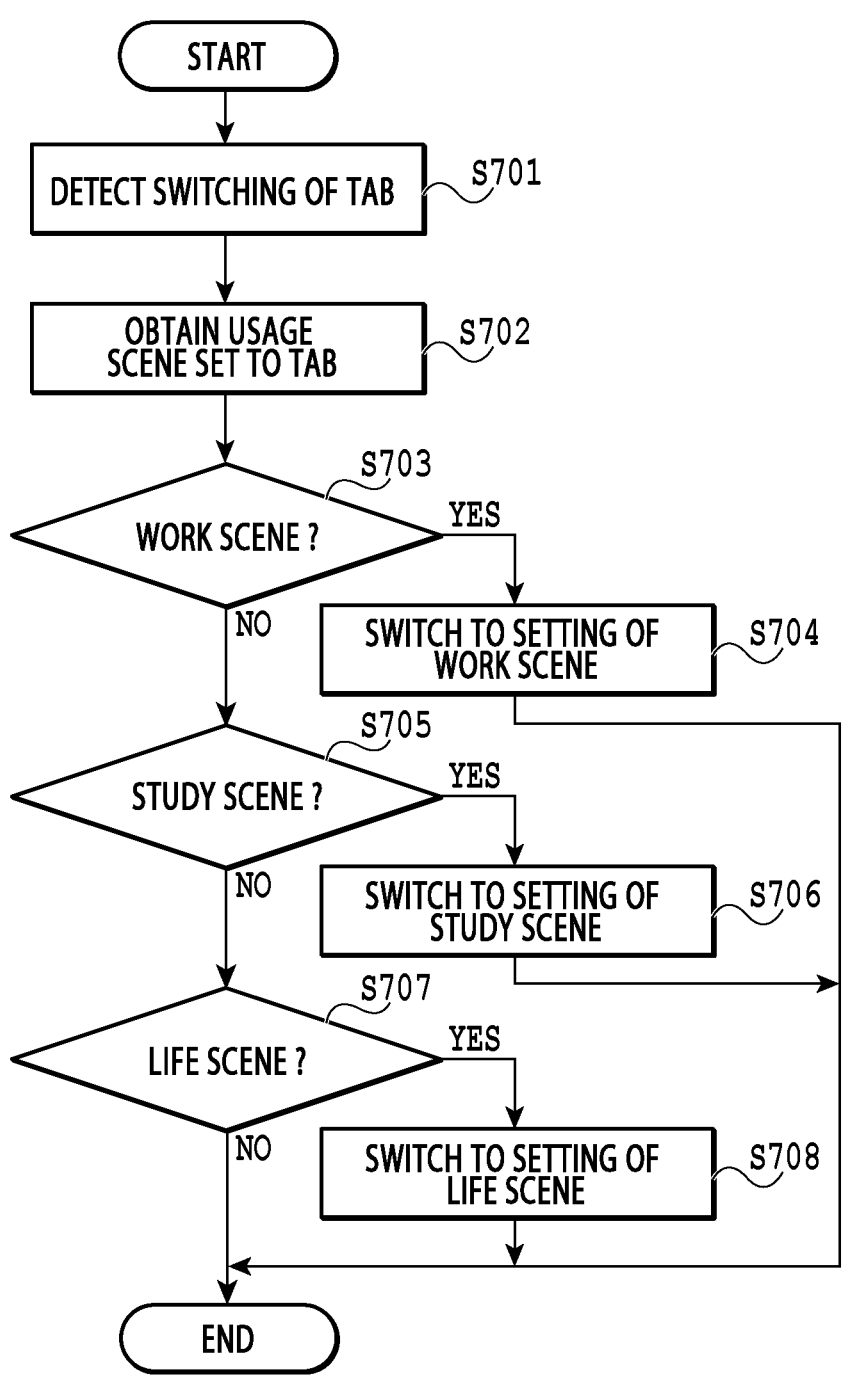
FIG. 7 is a flowchart illustrating setting switching processing.

FIG. 7 is a flowchart illustrating setting switching processing in accordance with the usage scene. The present processing is executed in a case where the user presses the tab corresponding to the custom home screen while the default home screen is being displayed. A series of processing illustrated in FIG. 7 is performed with the CPU 101 of the MFP 100 deploying a program code stored in the ROM 102 to the RAM 103 to execute. Alternatively, a part of or all the functions of the steps in FIG. 7 may be implemented by hardware such as an ASIC or an electronic circuit. Note that, a sign "S" in a description of the processing means it is a step in the flowchart.

Once the setting switching processing is started, and once the CPU 101 in S701 detects switching of the tab, the CPU 101 in S702 obtains the usage scene set to the tab. Thereafter, the MFP 100 is set according to the setting table illustrated in FIG. 5 in accordance with the obtained usage scene. That is, there is displayed the home screen on which the function icon in accordance with the selected scene is displayed, and also the MFP 100 operates in the main body operation mode of the MFP 100 in accordance with the selected scene.

The CPU 101 in S703 determines whether the obtained usage scene is the work scene. If the obtained usage scene is the work scene (Yes), the CPU 101 in S704 switches to the setting for the work scene and ends the setting switching processing. If the obtained usage scene is not the work scene in S703 (No), the processing proceeds to S705.

The CPU 101 in S705 determines whether the obtained usage scene is the study scene. If the obtained usage scene is the study scene (Yes), the CPU 101 in S706 switches to the setting for the study scene and ends the setting switching processing. If the obtained usage scene is not the study scene in S705 (No), the processing proceeds to S707.

The CPU 101 in S707 determines whether the obtained usage scene is the life scene. If the obtained usage scene is the life scene (Yes), the CPU 101 in S708 switches to the setting for the life scene and ends the setting switching processing. If the obtained usage scene is not the life scene in S707 (No), the setting switching processing ends.

Thus, with the user selecting the custom home screen from the default home screen depending on the usage scene, each setting for the corresponding usage scene including the operation mode is activated. This makes it possible to provide an image formation apparatus, a control method, and a storage medium that can suppress the decrease in the convenience.

Additionally, the default home screen may include a child tab taking into consideration the usage by a child. A child mode to switch the expression of a description displayed on the screen from kanji to hiragana or from hiragana to kanji for a case where a child scene corresponding to the child tab is selected may be included as the operation mode. Moreover, not only the switching from kanji to hiragana or from hiragana to kanji, the expression of a description itself may be changeable. For example, even in a case of indicating the same menu that is "default copy", the expression "default copy" in the work scene may be changeable to "usual copy" in the child scene.

Moreover, an elder tab taking into consideration the usage by an elder may be included, and an easy mode to omit a detailed setting item in a case where an elder scene corresponding to the elder tab is selected may be included as the operation mode.

Furthermore, the MFP 100 includes an LED status bar that notifies of a state of the apparatus and the usage scene on a front surface of the apparatus. Each custom home screen may include a switching button (a color switching unit) that switches an LED color lighted in accordance with the scene set to the displayed tab.

In the above-described examples, an example of switching the operation mode together by switching the tab is described; however, it is not limited thereto, and a configuration in which the operation mode is switched together with the transition of a page of the menu screen may be applicable.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-129219 filed Aug. 15, 2022, which is hereby incorporated by reference wherein in its entirety.

What is claimed is:

1. An image formation apparatus, comprising:
a display control unit that is capable of switching and displaying, on a display unit, a plurality of home screens at least including a plurality of custom home screens which correspond to a plurality of respective scenes including at least a work scene and on which a plurality of software buttons for executing an image processing function designated by a user are displayed; and
a changing unit that changes, based on one home screen of the plurality of home screens being displayed on the display unit by the display control unit based on a user operation for switching the plurality of home screens, an operation mode of the image formation apparatus to an operation mode corresponding to the one home screen displayed on the display unit based on the user operation for switching the plurality of home screens, wherein
in a case where the display control unit displays a custom home screen corresponding to the work scene, the changing unit changes the operation mode of the image formation apparatus to an operation mode for double-side printing in which a double-side printing setting is automatically activated, a silent mode setting to suppress operating noise of the image formation apparatus is activated, and automatic power-off setting to automatically power off the image formation apparatus is deactivated.

2. The image formation apparatus according to claim 1, wherein
the operation modes include at least one of a silent mode to suppress operating noise, a low cost mode to suppress consumption of a running cost, and an energy saving mode to suppress power consumption.

3. The image formation apparatus according to claim 1, wherein
the plurality of custom home screens correspond to a plurality of respective usage scenes, and each usage scene has a corresponding operation mode.

4. The image formation apparatus according to claim 3, wherein
the plurality of the custom home screens at least correspond to a work scene, a study scene, and a life scene.

5. The image formation apparatus according to claim 3, wherein
the changing unit performs switching to the custom home screen selected by a user from the plurality of the custom home screens corresponding to the usage scenes.

6. The image formation apparatus according to claim 5, wherein
the image formation apparatus has an operation mode to switch expression of a description in the custom home screen in accordance with the usage scene of the selected custom home screen.

7. The image formation apparatus according to claim 5, wherein
the image formation apparatus has an operation mode to omit a setting item in the custom home screen in accordance with the usage scene of the selected custom home screen.

8. The image formation apparatus according to claim 1, further comprising:
a color switching unit that switches an LED color.

9. The image formation apparatus according to claim 3, further comprising:
a lock unit that locks a custom home screen to prevent display of that custom home screen.

10. The image formation apparatus according to claim 9, wherein
if a password inputted by a user matches a registered password while the custom home screen is locked by the lock unit, the custom home screen is displayed.

11. A method of controlling an image formation apparatus that includes:
a display control unit that is capable of switching and displaying, on a display unit, a plurality of home screens at least including a plurality of custom home screens which correspond to a plurality of respective scenes including at least a work scene and on which a plurality of software buttons for executing an image processing function designated by a user are displayed; and a changing unit that changes, based on one home screen of the plurality of home screens being displayed on the display unit by the display control unit based on a user operation for switching the plurality of home screens, an operation mode of the image formation apparatus to an operation mode corresponding to the one home screen displayed on the display unit based on the user operation for switching the plurality of home screens, wherein in a case where the display control unit displays a custom home screen corresponding to the work scene, the changing unit changes the operation mode of the image formation apparatus to an operation mode for double-side printing in which a double-side printing setting is automatically activated, a silent mode setting to suppress operating noise of the image formation apparatus is activated, and automatic power-off setting to automatically power off the image formation apparatus is deactivated.

12. A non-transitory computer-readable storage medium storing a program causing a computer to execute a method of controlling an image formation apparatus that includes:

a display control unit that is capable of switching and displaying, on a display unit, a plurality of home screens at least including a plurality of custom home screens which correspond to a plurality of respective scenes including at least a work scene and on which a plurality of software buttons for executing an image processing function designated by a user are displayed; and a changing unit that changes, based on one home screen of the plurality of home screens being displayed on the display unit by the display control unit based on a user operation for switching the plurality of home screens, an operation mode of the image formation apparatus to an operation mode corresponding to the one home screen displayed on the display unit based on the user operation for switching the plurality of home screens, wherein in a case where the display control unit displays a custom home screen corresponding to the work scene, the changing unit changes the operation mode of the image formation apparatus to an operation mode for double-side printing in which a double-side printing setting is automatically activated, a silent mode setting to suppress operating noise of the image formation apparatus is activated, and automatic power-off setting to automatically power off the image formation apparatus is deactivated.

13. The image formation apparatus according to claim 1, wherein the image formation apparatus is capable of executing a plurality of functions including at least a print function to print image data on a printing medium and a reading function to read an original document.

14. The image formation apparatus according to claim 1, wherein the custom home screens each include at least one of a software key to execute a print function to print image data on a printing medium and a software key to execute a reading function to read an original document.

15. The image formation apparatus according to claim 1, wherein the image formation apparatus is a printer.

16. The image formation apparatus according to claim 1, wherein the image formation apparatus is an inkjet printer.

17. The image formation apparatus according to claim 1, further comprising:

a lock unit configured to lock display of the custom home screen, wherein in a case where the display control unit displays the custom home screen corresponding to the work scene, the changing unit changes the operation mode of the image formation apparatus to an operation mode in which the double-side printing setting is automatically activated, the silent mode setting to suppress operating noise of the image formation apparatus is activated, the automatic power-off setting to automatically power off the image formation apparatus is deactivated, and time of a lock timer for which the custom home screen corresponding to the work scene is locked by the lock unit is set shorter than time of lock timers for a custom home screen corresponding to a study scene and a custom home screen corresponding to a life scene.

18. The image formation apparatus according to claim 1, wherein in a case where the display control unit displays a custom home screen corresponding to a study scene, the changing unit changes the operation mode of the image formation apparatus to an operation mode in which silent mode setting to suppress operating noise of the image formation apparatus is activated.

19. The image formation apparatus according to claim 18, wherein in a case where the display control unit displays the custom home screen corresponding to the study scene, the changing unit changes the operation mode of the image formation apparatus to an operation mode in which the silent mode setting to suppress operating noise of the image formation apparatus is activated and automatic power-off setting to automatically power off the image formation apparatus is deactivated.

20. The image formation apparatus according to claim 1, wherein operation modes corresponding to the plurality of custom home screens are not operation modes associated by the user, but operation modes associated in advance with the plurality of custom home screens, respectively.

21. The image formation apparatus according to claim 1, wherein operation modes corresponding to the plurality of custom home screens are operation modes associated with the plurality of custom home screens, respectively, by the user.

22. The image formation apparatus according to claim 1, wherein the plurality of home screens further comprise a default home screen which is not associated with any operation mode, and the display control unit switches between displaying the plurality of custom home screens and the default home screen.

23. The image formation apparatus according to claim 22, wherein the display control unit displays, on the display unit, a plurality of tabs corresponding to the plurality of home screens including the default home screen and the plurality of custom home screens and in a case where any one of the plurality of tabs is selected, displays a home screen corresponding to the selected tab.

24. The image formation apparatus according to claim 22, wherein in a case where the display control unit displays the default home screen, the changing unit does not change the operation mode of the image formation apparatus.

25. The image formation apparatus according to claim 23, wherein the default home screen includes a child mode to switch expression of a description displayed on the screen between kanji and hiragana, and in a case where a tab corresponding to the child mode is selected, the changing unit changes the operation mode of the image formation apparatus to the child mode.

26. The image formation apparatus according to claim 25, wherein the default home screen further comprises an easy mode in which a setting item is omitted, and in a case where a tab corresponding to the easy mode is selected, the changing unit changes the operation mode of the image formation apparatus to the easy mode.

\* \* \* \* \*